United States Patent
Ichimi (10) Patent No.: US 9,189,657 B2
(45) Date of Patent: Nov. 17, 2015

(54) INFORMATION PROCESSING APPARATUS, METHOD OF CONTROLLING SAME, AND STORAGE MEDIUM

(75) Inventor: Hideshi Ichimi, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 1304 days.

(21) Appl. No.: 12/427,278

(22) Filed: Apr. 21, 2009

(65) Prior Publication Data

US 2009/0265759 A1    Oct. 22, 2009

(30) Foreign Application Priority Data

Apr. 21, 2008    (JP) ................. 2008-110184

(51) Int. Cl.
*G06F 21/00*    (2013.01)
*G06F 21/84*    (2013.01)

(52) U.S. Cl.
CPC ...................... *G06F 21/84* (2013.01)

(58) Field of Classification Search
CPC ......... G06F 21/36; G06F 21/70; G06F 21/82; G06F 21/83; G06F 21/84
USPC .......................................................... 726/22
See application file for complete search history.

(56) References Cited

U.S. PATENT DOCUMENTS

| | | | |
|---|---|---|---|
| 6,842,777 B1 * | 1/2005 | Tuli | 709/217 |
| 8,220,047 B1 * | 7/2012 | Soghoian et al. | 726/22 |
| 2004/0073809 A1 * | 4/2004 | Wing Keong | 713/201 |
| 2005/0212763 A1 | 9/2005 | Okamura | |
| 2008/0271128 A1 * | 10/2008 | Hermann | 726/7 |

FOREIGN PATENT DOCUMENTS

| | | |
|---|---|---|
| CN | 1313906 C | 5/2007 |
| JP | 2003-66826 A | 3/2003 |
| JP | 2005-284375 A | 10/2005 |
| JP | 2007-115039 A | 5/2007 |

OTHER PUBLICATIONS

Notice on the First Office Action issued in corresponding Chinese Patent Application No. 200910135543.3 dated Dec. 27, 2010. Full English translation provided.
Japanese Office Action issued in Counterpart Application JP2008-110184, issued Nov. 13, 2012.

* cited by examiner

*Primary Examiner* — Luu Pham
*Assistant Examiner* — Jahangir Kabir
(74) *Attorney, Agent, or Firm* — Rossi, Kimms & McDowell LLP (57) ABSTRACT

An information processing apparatus which is capable of ensuring mutual security in cases where security information is displayed in a state in which an image displayed on a display is open to the outside. A display displays an operation screen of the apparatus. An input section receives an operation instruction to the apparatus, and a network interface receives an operation instruction to the apparatus from an external device. A control section determines whether an instruction for displaying an operation screen containing security information is received from the input section or via the network interface. When determining that the instruction is received via the network interface, the control unit cause screen data for displaying the operation screen to be transmitted to the external device, and the operation screen containing the security information to be prevented from being displayed on the display.

7 Claims, 10 Drawing Sheets

COMPUTER IS IN USE BY SOME OTHER USER RIGHT NOW.

PLEASE WAIT.

INFORMATION PROCESSING APPARATUS, METHOD OF CONTROLLING SAME, AND STORAGE MEDIUM

BACKGROUND OF THE INVENTION

1. Field of the Invention

The present invention relates to an information processing apparatus and a method of controlling the information processing apparatus, and more particularly, to an information processing apparatus and a method of controlling the information processing apparatus characterized by techniques of security measures taken when an image displayed on a display is output to an external device, or inversely, an image displayed on the external device is output to the display, as well as a computer-readable storage medium storing a computer-executable program for executing the method.

2. Description of the Related Art

Recently, it becomes possible to display a desktop screen of one computer on another computer via a network by making use the following software: VNC (Virtual Network Computing: AT & T Cambridge Research Laboratory), Remote Assistance by Microsoft Corporation, Desktop on Call by IMB, and so forth, for example. Many of the above-mentioned software cause the desktop screen to be displayed on the other computer, while ensuring security by requesting a password for authentication at the time of connection to the one computer (see e.g. Japanese Patent Laid-Open Publication No. 2003-66826).

Further, in recent years, a character input technique referred to as a virtual keyboard, a screen keyboard, or a software keyboard has been realized, and there are cases where a password or information having high security is input using such a keyboard.

For example, many of PDAs are not provided with a keyboard as hardware due to mechanical restrictions, and hence a virtual keyboard on which the alphabetic keys are arranged is displayed on a touch panel LCD, and desired characters are entered by operating this virtual keyboard.

On the other hand, in a general personal computer or the like having a keyboard as hardware, if a virtual keyboard is displayed on a display thereof, it is also possible to select desired ones from the alphabetic keys displayed thereon with a mouse. Therefore, it is possible to achieve character entry only by operating the mouse.

For example, on such a virtual keyboard, it is general that highlighting of each selected key or like processing is performed so as to enable pressing of the key to be easily recognized.

Now, when a virtual keyboard is used in such a state in which the desktop screen is open to the outside, highlighting of the selected key can be viewed on the external device. Insofar as ordinary text input is concerned, there is no problem. However, if character entry is performed for the purpose of inputting a password or the like, there is a possibility of occurrence of a problem that security cannot be assured.

To cope with this problem, in a situation where security is required to be ensured, e.g. at the time of inputting a password or the like, it is a conventional practice not to permit the desktop screen to be open to the outside for security assurance (see e.g. Japanese Patent Laid-Open Publication No. 2005-284375).

However, when a password is input, by displaying a screen of a computer (local computer) on an external computer (remote computer), the software keyboard is displayed for an input operation. Then, highlighting of a key occurring as a response to pressing of the key performed for inputting the password is displayed on the display of the local computer. As a result, the password which is being input from the remote computer can be viewed on the display of the local computer, which brings about a security problem.

SUMMARY OF THE INVENTION

The present invention provides an information processing apparatus and a method of controlling the information processing apparatus which are capable of ensuring mutual security in cases where security information is displayed in a state in which an image displayed on a display is open to the outside, and a computer-readable storage medium storing a computer-executable program for executing the method.

More specifically, the present invention provides an information processing apparatus and a control method which are capable of ensuring security in case where security information is displayed on a display in a state in which an image displayed on the display is open to the outside, and further are capable of ensuring security in case where the security information is displayed on the external display, and a computer-readable storage medium storing a computer-executable program for executing the method.

In a first aspect of the present invention, there is provided an information processing apparatus that is connected to an external apparatus via a network comprising a display adapted to display an operation screen of the information processing apparatus, an operating section adapted to receive an operation instruction to the information processing apparatus, a reception unit adapted to receive an operation instruction to the information processing apparatus from the external device, a determining unit adapted to determine whether an instruction for displaying an operation screen containing security information is received from the operating section or from the reception unit, and a control unit adapted to be operable when it is determined that an instruction for displaying the operation screen containing the security information is received from the reception unit, to cause screen data for displaying the operation screen containing the security information to be transmitted to the external device, and the operation screen containing the security information to be prevented from being displayed on the display.

In a second aspect of the present invention, there is provided a method of controlling an information processing apparatus which is connected to an external device via a network, and includes a display which displays an operation screen of the information processing apparatus, an operating section for receiving an operation instruction to the information processing apparatus, and a reception unit for receiving an operation instruction to the information processing apparatus from the external device, comprising determining whether an instruction for displaying an operation screen containing security information is received from the operating section or from the reception unit, and causing, when it is determined that the instruction for displaying the operation screen containing the security information is received from the reception unit, screen data for displaying the operation screen containing the security information to be transmitted to the external device, and the operation screen containing the security information to be prevented from being displayed on the display.

In a third aspect of the present invention, there is provided a computer-readable storage medium storing a computer-executable program for causing a computer to execute a method of controlling an information processing apparatus which is connected to an external device via a network, and includes a display which displays an operation screen of the information processing apparatus, an operating section for receiving an operation instruction to the information processing apparatus, and a reception unit for receiving an operation instruction to the information processing apparatus from the external device, wherein the method comprises determining whether an instruction for displaying an operation screen containing security information is received from the operating section or from the reception unit, and causing, when it is determined that the instruction for displaying the operation screen containing the security information is received from the reception unit, screen data for displaying the operation screen containing the security information to be transmitted to the external device, and the operation screen containing the security information to be prevented from being displayed on the display.

According to the present invention, there is provided an information processing apparatus and a control method which are capable of ensuring mutual security in case where security information is displayed in a state in which an image displayed on a display is open to the outside.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
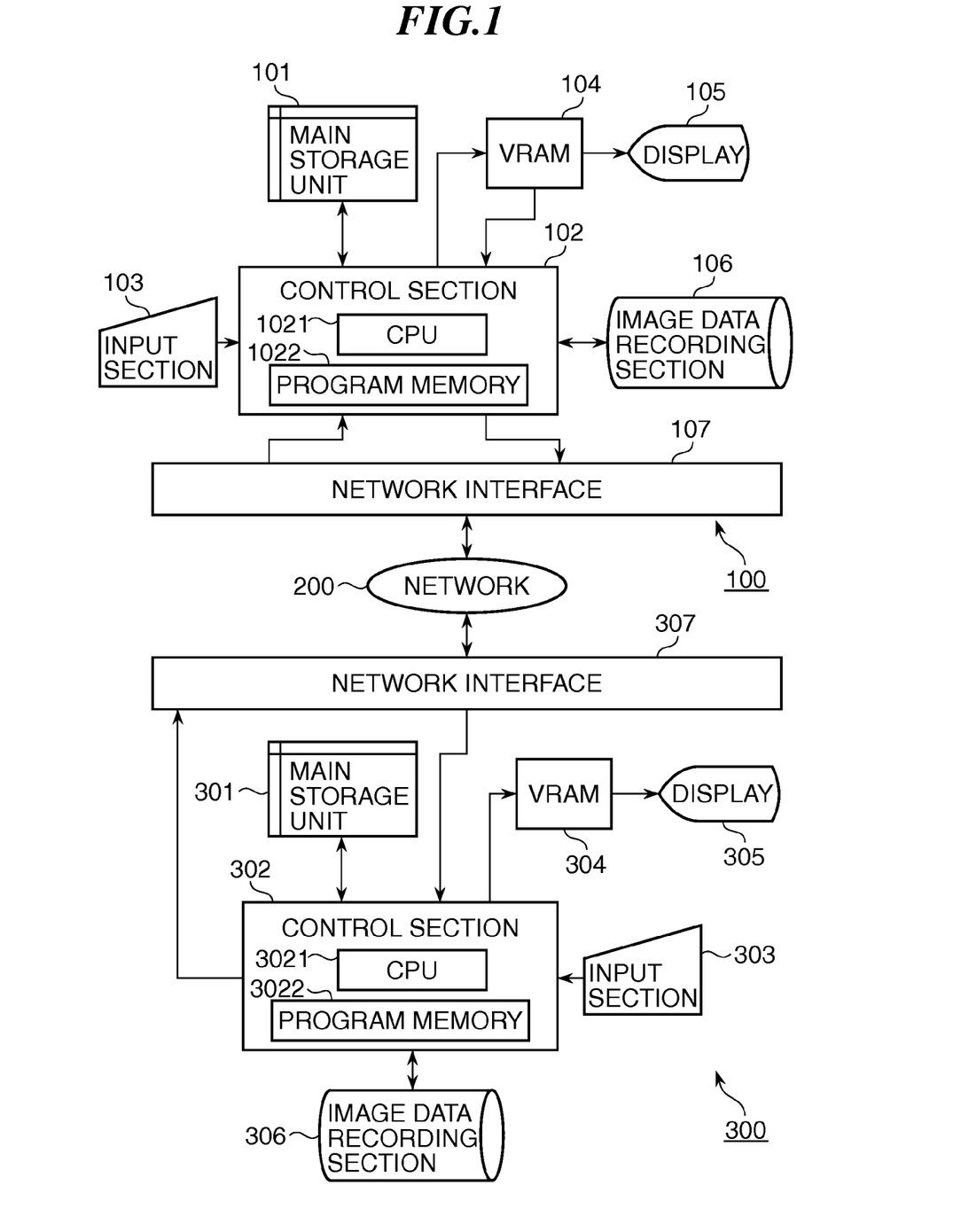
FIG. 1 is a block diagram showing an example of a configuration of an information processing system including an information processing apparatus according to a first embodiment of the present invention.

FIG. 1 is a block diagram showing an example of a configuration of an information processing system including an information processing apparatus according to a first embodiment of the present invention.

As shown in FIG. 1, the present information processing system is constructed by connecting a server 100 as an information processing apparatus according to the first embodiment of the present invention and a client 300 as an example of an external device, via a network 200.

The server 100 is a sender of the contents of a VRAM or a virtual VRAM, and the client 300 is a receiver of the contents of the VRAM or the virtual VRAM of the server 100.

First, a description will be given of a configuration of the server 100.

A main storage unit 101 is implemented e.g. by a semiconductor memory. The main storage unit 101 is formed by a RAM or the like, and is used as a work area of a CPU 1021. Further, an area of the main storage unit 101 is allocated to a virtual VRAM. The virtual VRAM is an area regarded as a VRAM separately from the VRAM 104. In the present embodiment, by using the virtual VRAM, it is possible to make an operation screen displayed on a display 105 of the server 100 different from an operation screen displayed on a display 305 of the client 300. Image data stored in the virtual VRAM for being displayed on the operation screen can be transferred to the VRAM 104, and can be delivered to the client 300. The control of display of the operation screen using the virtual VRAM will be described hereinafter. A control section 102 is comprised of the CPU 1021 and a program memory 1022 storing programs, and the CPU 1021 centralizedly controls component elements of the server 100 in accordance with control procedures by respective associated programs stored in the program memory 1022.

An input section (operating section) 103 receives an instruction for operating the server 100. Although the input section 103 may be an input device such as a keyboard or a mouse, in the present embodiment, in addition to input by the input device, touch input is also assumed which is made via a virtual keyboard appearing as a virtual input device on a touch panel-equipped liquid crystal or the like which is integrally formed with the display 105.

The VRAM (video RAM) 104 is mainly comprised of a semiconductor memory, in which contents of a screen formed by the control section 102 are written, and the contents are output to the display 105. The display 105 on which images of various pieces of information are displayed is implemented e.g. by a liquid crystal display.

An image data recording section 106 is mainly comprised of a magnetic recording device, such as a semiconductor memory or a hard disk, for storing (recording) an image formed by capturing contents of the screen stored in the VRAM 104 or formed by the control section 102. Further, the captured image may be delivered to the network 200 without being recorded in the image data recording section 106.

A network interface 107 for connection to the network 200 takes out an image of the captured screen directly or from the image data recording section 106 and transmits the same to the client 300 via the network 200, according to an instruction of the control section 102.

Next, a description will be given of the configuration of the client 300.

A main storage unit 301 is implemented e.g. by a semiconductor memory. A control section 302 is comprised of a CPU 3021 and a program memory 3022 storing programs, and the CPU 3021 centralizedly controls component elements of the client 300 in accordance with control procedures by respective associated programs stored in the program memory 3022.

An input section (operating section) 303 receives an instruction for operating the client 300. Further, in a case where remote desktop software, such as the VNC mentioned hereinabove, is being executed on the client 300, the operating instruction received by the input section 303 can be an instruction for operating the server 100. The input section 303 is formed by an input device such as a keyboard or a mouse. A VRAM 304 is mainly comprised of a semiconductor memory, in which contents of a screen formed by the control section 302 are written, and the contents are output to the display 305. The display 305 is implemented e.g. by a CRT or a liquid crystal display.

An image data recording section 306 is mainly comprised of a magnetic recording device, such as a semiconductor memory o a hard disc, for storing an image of the screen which is received via a network interface 307. Further, the image of the received screen can be displayed on the display 305 not via the image data recording section 306 but directly via the VRAM 304.

Figure 2:
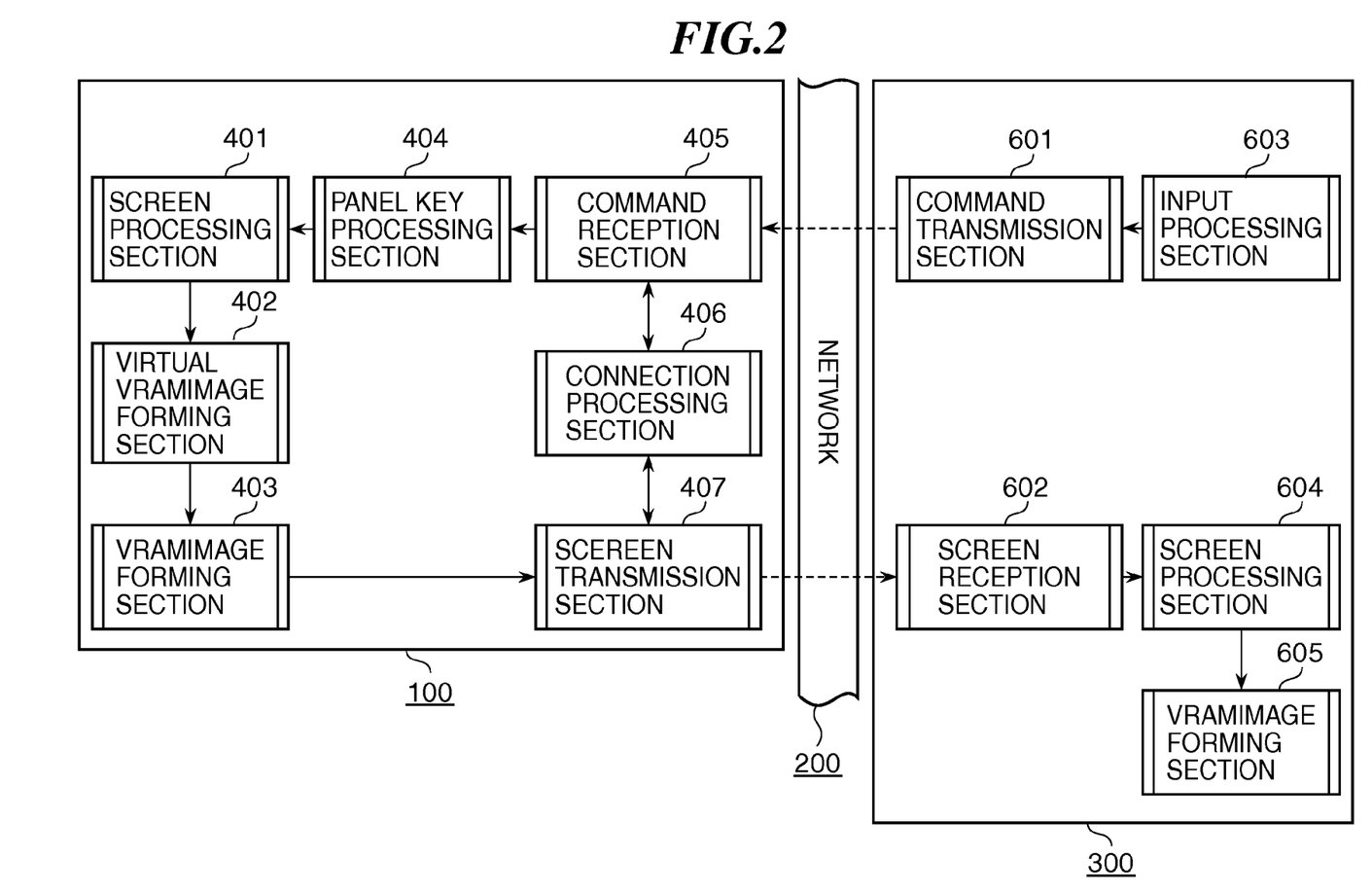
FIG. 2 is a diagram useful in explaining programs of the information processing system appearing in FIG. 1.

FIG. 2 is a diagram useful in explaining programs of the information processing system appearing in FIG. 1.

First, the software configuration of the server 100 will be described with reference to FIG. 2. Blocks denoted by respective reference numerals 401 to 407 are program modules. These program modules are stored in the program memory 1022 of the server 100, and are executed by the CPU 1021.

A screen processing section 401 forms contents of the screen displayed on the display 105, and for example, forms information on the screen in response to a key event of a panel key processing section 404. Further, the screen processing section 401 manages controls forming each screen (all components of the screen, such as buttons, and entry fields) using respective IDs, and hence it is possible to recognize that a password entry screen or any other screen requiring security is called.

A virtual VRAM image forming section 402 writes out the contents of the screen formed in the screen processing section 401 into the virtual VRAM before writing out into the VRAM 104. At this time point, the contents are not yet displayed on the panel, but are held in the memory.

A VRAM image forming section 403 takes out the contents written out by the virtual VRAM image forming section 402 into the virtual VRAM, from the virtual VRAM, and writes out the content of the screen into the actual VRAM 104, for displaying the screen on the display 105. Further, the virtual VRAM image forming section 402 does not necessarily write out the contents of the virtual VRAM into the VRAM 104, but sometimes writes out the other contents into the VRAM 104, as required.

The panel key processing section 404 receives a key event from the client 300 or from the input section 103 of the server 100, and assigns a key which the screen processing section 401 can handle, to the key event, to thereby request the screen processing section 401 to process the key event.

A command reception section 405 receives the contents of a command sent from a command transmission section 601 of the client 300 via the network 200. At this time, for subsequent determination as to whether a command is input from the client 300 or from the display 105 of the server 100, a flag or the like indicating, for example, that the command is input from the client 300 is stored. After receiving the command, the command reception section 405 passes the contents of the key event to the panel key processing section 404 to thereby request the same to process the key event.

A connection processing section 406 performs authentication of the client 300, connection to and disconnection from the same, and monitoring etc. of the same via the network 200. First, after the connection processing section 406 enables the server 100 and the client 300 to communicate with each other, it becomes possible to receive commands from the client 300 and transmit images to the client 300.

A screen transmission section 407 transmits a captured virtual VRAM to the client 300. Alternatively, the screen transmission section 407 does not necessarily transmit the contents of the virtual VRAM, but sometimes transmits the other contents to the client 300, as required.

Next, a description will be given of the software configuration of the client 300. Blocks denoted by respective reference numerals 601 to 607 are program modules. These program modules are stored in the program memory 3022 of the client 300, and are executed by the CPU 3021.

The command transmission section 601 transmits user's operations on the display 305 of the client 300 to the command reception section 405 via the network 200. The operations on the display 305 include, for example, key input using the mouse or the keyboard.

A screen reception section 602 receives the contents of transmission by the screen transmission section 407 of the server 100 via the network 200. The screen reception section 602 transfers the contents of reception to a screen processing section 604 to request the same to perform screen forming processing.

An input processing section 603 recognizes an operation performed on the display 305 of the client 300 for key input using the mouse or the keyboard, and passes the contents of the input to the command transmission section 601 to request the same to transmit the same to the server 100.

The screen processing section 604 receives the contents of reception passed from the screen reception section 602, forms a screen to be displayed, and requests the VRAM image forming section 403 of the server 100 to form an image to be displayed on the display 305 of the client 300. Further, the screen processing section 604 sometimes receives the contents of reception passed from the screen reception section 602, and requests the VRAM image forming section 403 to display another image on the display 305, as required.

A VRAM image forming section 605 receives the contents passed from the screen processing section 604, writes the contents into the VRAM 304, and displays the screen on the display 305 of the client 300.

It should be noted that in the present embodiment, the program modules 601 to 607 are collectively referred to as remote desktop client software. The operations of the remote desktop client software and the program modules of the server 100 operate make it possible to cause the operation screen displayed on the display 105 of the server 100 to be displayed on the display 305 of the client 300. Further, it is possible to transfer the operation input from the input section 303 of the client 300 to the server 100. This makes it possible to provide a user interface to the user of the client 300 as if the user is operating the server 100 at the client 300.

Figure 3:
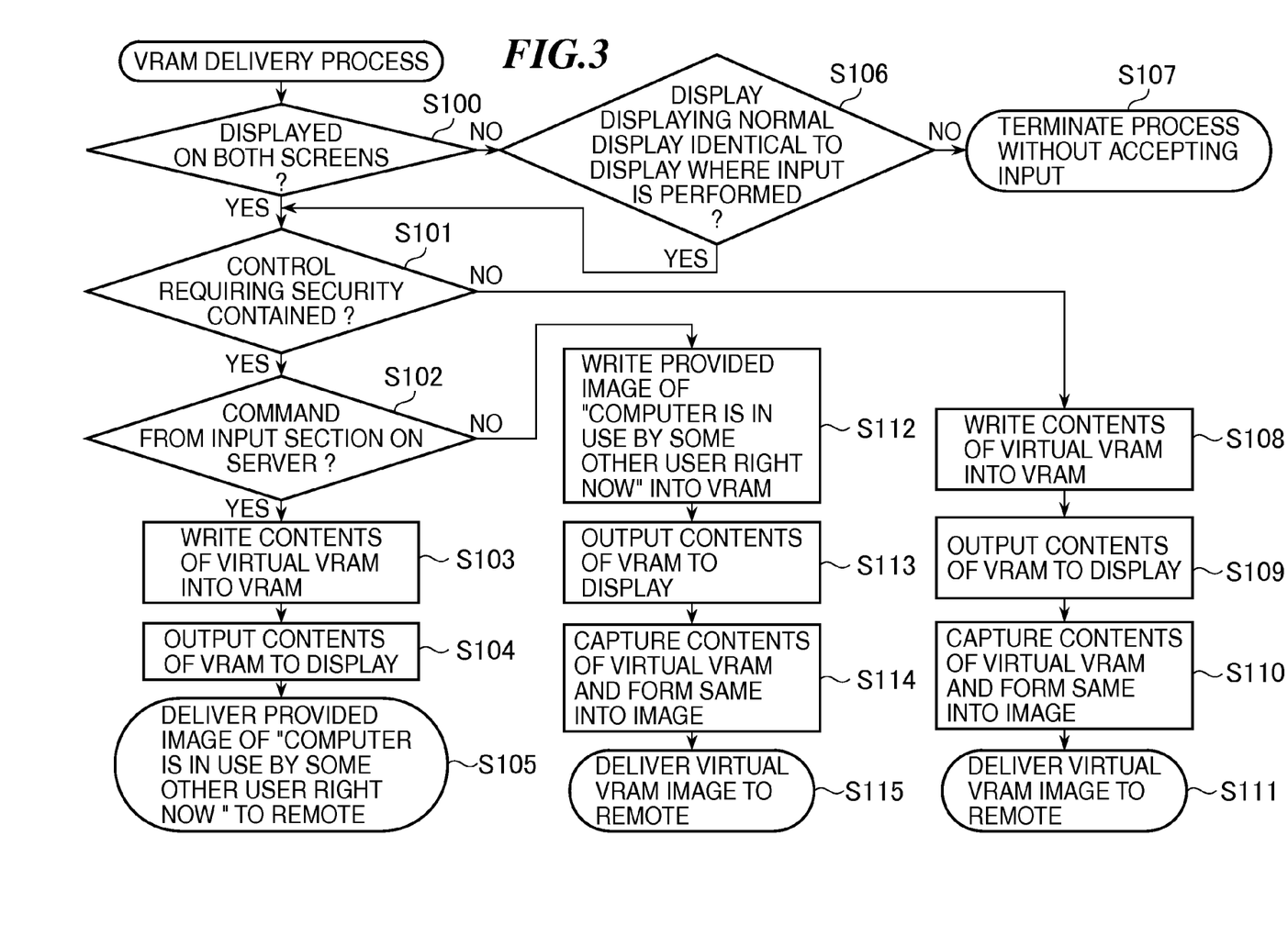
FIG. 3 is a flowchart of a VRAM delivery process executed by the information processing apparatus (server) appearing in FIG. 1.

FIG. 3 is a flowchart of a VRAM delivery process executed by the information processing apparatus (server) appearing in FIG. 1.

Here, the term "VRAM delivery" is intended to mean capturing the contents of the virtual VRAM to be written into the VRAM 104 and delivering the captured contents to an external device (e.g. client 300) so as to transmit the image displayed on the display 105 to the external device.

In the present embodiment, the term "VRAM delivery" is intended to mean, more specifically, the following processing:

The control section 102 accepts the command from the client 300, or from the input section 103, and according to the instruction of the control section 102, the contents of the virtual VRAM are captured, and if required, are recorded in the image data recording section 106. Then, the contents are transmitted to the client 300 via the network interface 107.

A program for executing this VRAM delivery process is stored in e.g. the program memory 1022, and is executed by the CPU 1021.

When the input section 103 of the server 100 is operated, or when there is an input performed on the input section 303 of the client 300 using the remote desktop software, for operating the server 100, the VRAM delivery process shown in FIG. 3 starts to be executed. First, in a step S100, a status of the screen display is discriminated. If a normal screen is displayed on both of the display 105 of the server 100 and the display 305 of the client 300, the process proceeds to a step S101, whereas if not, the process proceeds to a step S106. It should be noted that the term "normal screen" is intended to mean an operation screen to be originally displayed on the display 105 or the display 305, but not a dummy screen, referred to hereinafter.

In the step S100, to determine on which display the normal screen is displayed, a flag (for indicating the server 300 and the client 100, only the client 300, or the only server 100) is provided in advance in the main storage unit 101, and according to the status of the flag, the determination is performed.

In the step S106, it is determined whether or not the apparatus (the server 100 or the client 300) the display of which displaying the normal screen and the apparatus on which the operation input has been performed are identical to each other. As a result of the determination, if the apparatus on which the normal screen is displayed is not identical to the apparatus on which the operation input has been performed, the process proceeds to a step S107, wherein the command is not accepted, followed by terminating the present process.

If it is determined in the step S100 that the normal screen is displayed on both the display 105 and the display 305, the process proceeds to the step S101, as mentioned above. Further, if it is determined in the step S106 that the apparatus on which the normal screen is displayed is identical to the apparatus on which the operation input has been performed, the process also proceeds to the step S101. It should be noted that based on the operation input from the server 100 or the client 300, the operation screen is displayed on the display 105 based on the operation input.

In the step S101, it is determined whether or not a control (entry field or the like) containing security information exists in the contents of the screen formed by the screen processing section 401. For example, if a field for entry of a user ID, a field for entry of a password, or a field for entry of personal information, such as an address or the like, exists in the operation screen, it is determined that the control containing security information exists. The operation screen shown in FIG. 5, referred to hereafter, is an example of the screen in which the control containing security information exists.

The determination in the step S101 is performed by listing IDs of controls which can contain security information in advance, storing the IDs in the main storage unit 101 or the like, and checking if any of these IDs are identical to any of the ID's of controls contained in the screen formed by the screen processing section 401. Alternatively, it is also possible to perform the determination by giving IDs of a specific type to the controls which can contain security information, and determining if any of these IDs are contained in the screen formed by the screen processing section 401.

If it is determined in the step S101 that a control which can contain security information exists, the process proceeds to a step S102, whereas if the no control which can contain security information exists in the contents to be displayed, the process proceeds to a step S108.

In the step S108, the contents of the virtual VRAM are written into the VRAM 104, and the process proceeds to a step S109 to output the contents of the VRAM 104 to the display 105. The contents of the virtual VRAM are captured to create an image in a step S110, and the captured contents are delivered to the remote computer (the client 300 in this example) in a step S111, followed by terminating the present process. In the virtual VRAM, the image data of the operation screen to be originally displayed on the display 105 of the server 100 is stored.

Next, if it is determined that any control containing security information is contained in the contents to be displayed (YES to the step S101), it is determined in the step S102, so as to determine which of the display 105 and the display 305 the contents are to be displayed, whether or not the present command is input from the input section 103.

If it is determined in the step S102 that the command is from the input section 103, the process proceeds to a step S103, wherein the contents of the virtual VRAM are written into the VRAM 104, and then the process proceeds to a step S104, wherein the contents of the VRAM 104 are output to the display 105. It should be noted that the virtual VRAM stores the image data of the operation screen to be originally displayed on the display 105 of the server 100.

Further, after displaying the screen in the step S104, the process proceeds to a step S105, wherein the image containing a message saying, for example, that "Computer is in use by some other user right now" which has been prepared in advance in the image data recording section 106 to the remote computer, followed by terminating the present process. This operation screen transmitted to the client 300 in the step S105, which is different from the operation screen to be originally displayed on the display 105, is referred to as the dummy screen. This makes it possible to prevent the operation screen containing security information from being displayed on the display 305 of the client 300, in a case where the operation screen containing security information is displayed on the display 105 of the server 100. Therefore, it is possible to prevent the security information from being illegally viewed by a third party. It should be noted that although in the step S105, the dummy screen is transmitted to the client 300, no image data may be transmitted. In this case, no operation screen is displayed on the display 305 of the client 300. Further, the dummy screen is only required to be different from the screen displayed on the display 105, and may be a screen displaying a message other then the message saying that "Computer is in use by some other user right now".

On the other hand, if it is determined in the step S102 that not the command is not from the input section 103, but from the input section 303 of the client, the process proceeds to a step S112.

In the step S112, an image (dummy screen) which has been provided in advance in the image data recording section 106, for example, in which the massage saying that "Computer is in use by some other user right now" is contained is written into the VRAM 104. Then, the contents of the VRAM 104 are output to the display 105, in a step S113.

Thereafter, in a step S114, the contents of the virtual VRAM are captured and formed into an image, and the process proceeds to a step S115, wherein the captured image of the virtual VRAM is delivered to the remote computer i.e. the client 300, followed by terminating the present process. If the operation screen containing security information is displayed on the display 305 of the client 300 based on the operation by the client 300, it is possible to prevent the operation screen containing the security information from being displayed on the display 105 of the server 100. This makes it possible to prevent the security information from being illegally viewed by a third party. It should be noted that although in the step S112, the dummy screen is written into the VRAM 104, no screen data may be written into the VRAM 104. In this case, no operation screen is displayed on the display 105. Further, the dummy screen is only required to be different from the screen displayed on the display 305, and may be a screen displaying a message other then the message saying that "Computer is in use by some other user right now".

Figure 7:
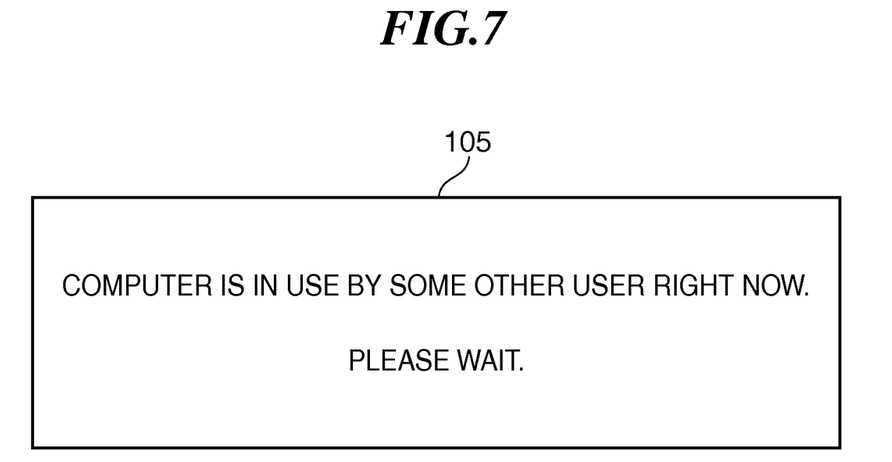
FIG. 7 is a diagram showing an example of a message saying that such a display as shown in FIG. 6 is prevented from being displayed on the display appearing in FIG. 1.

That is, if it is determined that the display of the image is based on the input operation performed on the server 100, the screen transmission section 407 stops outputting the image displayed on the display 105 to the client 300. Then, the screen transmission section 407 outputs the image of the dummy screen containing the massage saying that "Computer is in use by some other user right now" which prevents the display of security information (an indication formed by text for avoiding display of the security information) to the client 300. The dummy screen is, for example, a screen as shown in FIG. 7.

Further, if it is determined that the display of the image is based on the input operation performed on the client 300, the screen transmission section 407 stops outputting the image displayed on the client 300 to the display 105. Then, the image of the dummy screen for preventing the display of security information is output to the display 105.

Figure 4:
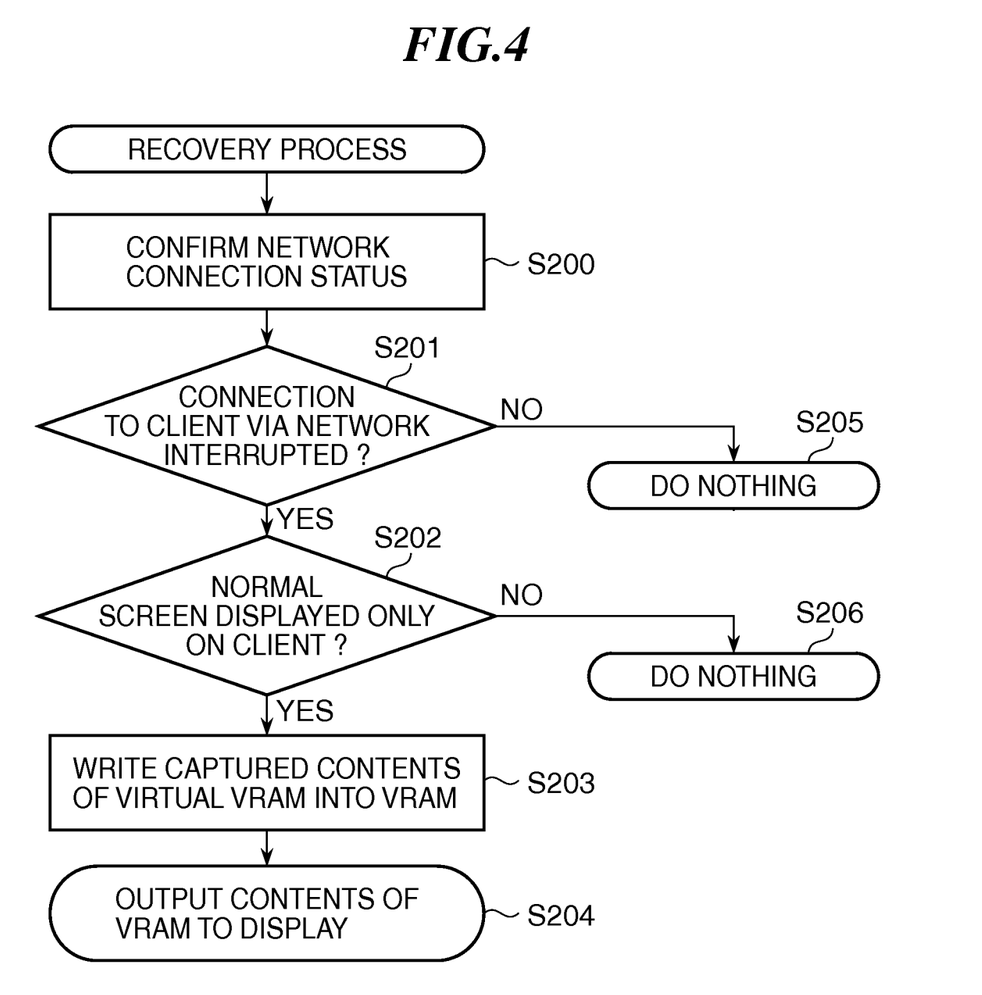
FIG. 4 is a flowchart of a recovery process executed by the information processing apparatus (server) when network connection with a client is closed.

FIG. 4 is a flowchart of a recovery process executed by the information processing apparatus (server) when network connection with a client is closed.

More specifically, the recovery process is executed when the network connection with the client is closed in a state after the steps S112 to S115 are executed in FIG. 3, wherein the screen containing the control containing security information is displayed on the display 305, and the dummy screen formed of the contents including the message saying that "Computer is in use by some other user right now" is output to the display 105 in place of the normal screen.

If the network connection from the client is disconnected in this state, the server does not recover from the state in which the dummy screen is displayed instead of the screen containing the security information, and hence it is impossible to operate the server 100. Therefore, the screen containing the security information displayed only on the client 300 at that time is displayed on the display 105 of the server to thereby enable the processing to be continued.

In the present embodiment, to detect disconnection from the client 300, there are envisaged several methods including, for example, a method of setting up a timer for use in confirming network connection by the connection processing section 406.

Referring to FIG. 4, first, in a step S200, the status of connection to the client 300 via the network 200 is confirmed. After confirming the connection status, in a step S201, it is determined whether or not the connection to the client 300 is interrupted. If is determined in the step S201 that the connection to the client 300 is not interrupted, the process proceeds to a step S205 to terminate the present process immediately.

On the other hand, if it is determined in the step S201 that the connection to the client 300 is interrupted, the process proceeds to a step S202, wherein it is determined whether or not the normal screen is displayed only on the client 300. Then, if it is determined in the step S202 that the present stage is not a state in which the normal screen is displayed only on the client 300, the process proceeds to a step S206 to immediately terminate the present process.

Further, if it is determined in the step S202 that the normal screen is displayed only on the client 300, the process proceeds to a step S203.

In the step S203, on condition that the normal screen is displayed only on the client 300, the image of the virtual VRAM captured in the step S114 in FIG. 2 is read and written into the VRAM 104. The image of the virtual VRAM is the image of the operation screen which is displayed on the display 305 of the client 300. After writing the image in the VRAM 104, the process proceeds to a step S204 to output the contents of the VRAM 104 to the display 105.

According to the recovery process in FIG. 4, it is possible to prevent the server 100 from being left in a state unable to operate, with the dummy screen displayed on the display 105 of the server 100 in a state where the communication between the server 100 and the client 300 is disconnected.

Figure 5:
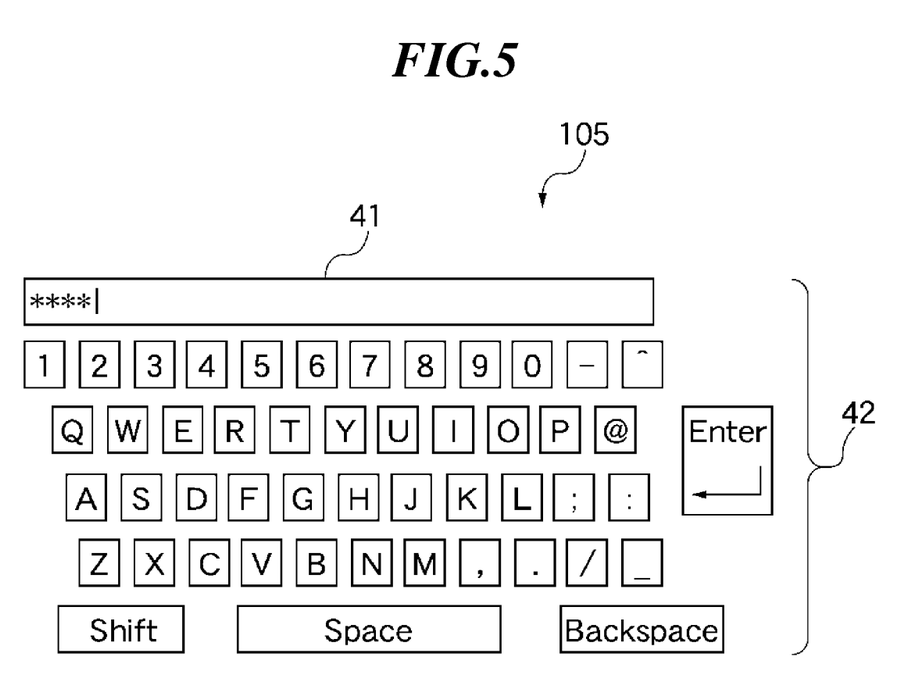
FIG. 5 is a diagram showing an example of an image containing security information, which is displayed on a display appearing in FIG. 1.

FIG. 5 is a diagram showing an example of the image containing security information, which is displayed on the display appearing in FIG. 1.

In FIG. 5, the display 105 displays a password entry window 41 and a virtual keyboard 42.

Figure 6:
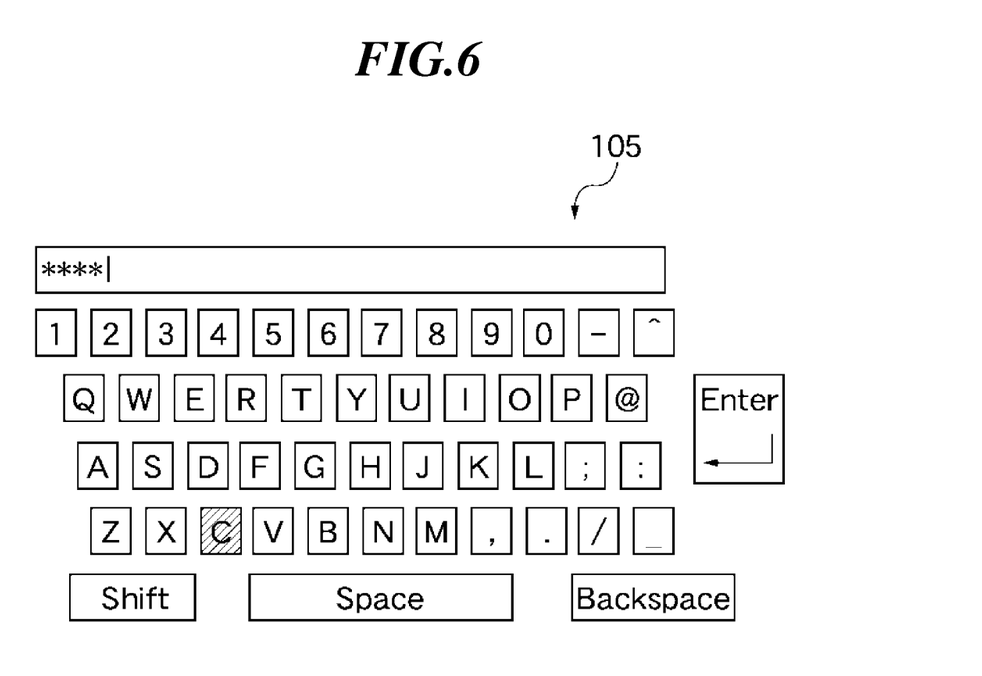
FIG. 6 is a diagram showing a virtual key "C" appearing in FIG. 5 in a state highlighted according to selection thereof.

FIG. 6 is a diagram showing a virtual key "C" appearing in FIG. 5 in a state highlighted according to selection thereof.

Let it be assumed that such an image as shown in FIG. 6 is displayed on the display 105 of the server 100, or captured and delivered as it is to be displayed on the display 305 of the client 300. Since the input character strings are not displayed as they are on the password entry window 41 but "*"s are displayed, which prevents the password from being illegally viewed by a third party. However, if a key displayed on the virtual keyboard 42 is pressed, the pressed key is highlighted. For example, when the key "C" is pressed, the pressed key "C" is highlighted, which enables the fact that this key has been pressed to be recognized both on the server 100 and the client 300. Therefore, in the present embodiment, the server 100 handles such an operation screen as shown in FIG. 5 as one in which a control containing security information exists.

FIG. 7 is a diagram showing an example of a screen (dummy screen) displaying a message for preventing the display of the screen shown in FIG. 6, which is to be displayed on the display appearing in FIG. 1.

According to the above-described method, an image (dummy screen) displaying the message saying that "Computer is in use by some other user right now" as shown in FIG. 7 is provided in the image data recording section 106 in advance, and the normal screen as shown in FIG. 6 is replaced by the image. Therefore, even if this image is output to the display 105 of the server 100 or is delivered via the network 200, the security is ensured.

Figure 8:
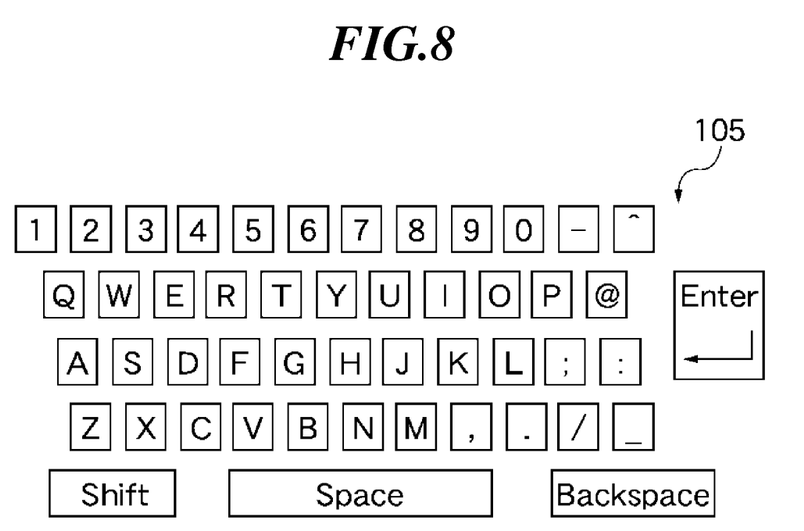
FIG. 8 is a diagram showing an example of a virtual keyboard displayed on the display appearing in FIG. 1, in a state in which no virtual key is highlighted.

FIG. 8 is a diagram showing an example of a virtual keyboard in a state in which no virtual key is highlighted, which is displayed on the display appearing in FIG. 1. The operation screen in FIG. 8 shows another example of the dummy screen.

In place of the image shown in FIG. 7, by fitting an image part of key tops of the virtual keyboard as shown in FIG. 8 onto the display shown in FIG. 6 in a manner properly superimposed thereon, it is possible to obtain the displayed status shown in FIG. 5, which makes making it possible to prevent a third party from illegally recognizing which key is being pressed. Therefore, a method using this image also makes it possible to safely output the image to the display 105 of the server 100 or safely deliver the same to the network 200.

As measures for security, it is general that characters input in the password entry window are each replaced by a specific character (e.g. "*") which has nothing to do with the input characters.

However, in a case where a password is input using the virtual keyboard on the screen being subjected to the VRAM delivery or like cases, even if the characters input to the password entry window are each replaced by the specific character for display, there arises the following inconvenience:

Since the virtual key which is pressed on the virtual keyboard is highlighted for a predetermined time, this undesirably enables the password to be recognized on the client 300 to which the screen is delivered or the server 100 which delivers the screen.

However, the control process of the VRAM delivery in the above-described embodiment provides the following advantageous effects:

That is, during a time period over which a screen containing a control containing security information is displayed on the display 105 of the server 100, the dummy screen displaying the massage saying that "Computer is in use by some other user right now" is delivered to the client 300, in place of the screen (normal screen). This makes it possible to prevent secret information from being known on the client 300.

Inversely, during a time period over which a screen containing a control containing security information is displayed on the client 300, the dummy screen displaying the massage saying that "Computer is in use by some other user right now" is output to the display 105 of the server 100, in place of the screen (normal screen). Therefore, this also makes it possible to prevent secret information from being known on the server 100.

Further, there is a possibility of the server becoming impossible to be operated, in case the connection to the client 300 via the network 200 is interrupted in a state in which while a screen containing a control containing security information is being displayed only on the client 300, the screen displaying the message saying that "Computer is in use by some other user right now" is output to the display 105 of the server 100, in place of the screen (normal screen).

In this state, if the connection to the client 300 via the network 200 is interrupted, there is a possibility that the server becomes impossible to be operated, leaving the screen "Computer is in use by some other user right now" displayed on the display 105 of the server 100.

However, in the recovery process in the present embodiment executed when the connection to the client 300 via the network 200 is interrupted, the screen containing security information, which is displayed on the client 300, is caused to be displayed on the display 105 of the server 100. This makes it possible to continue the operation on the server 100.

Figure 9:
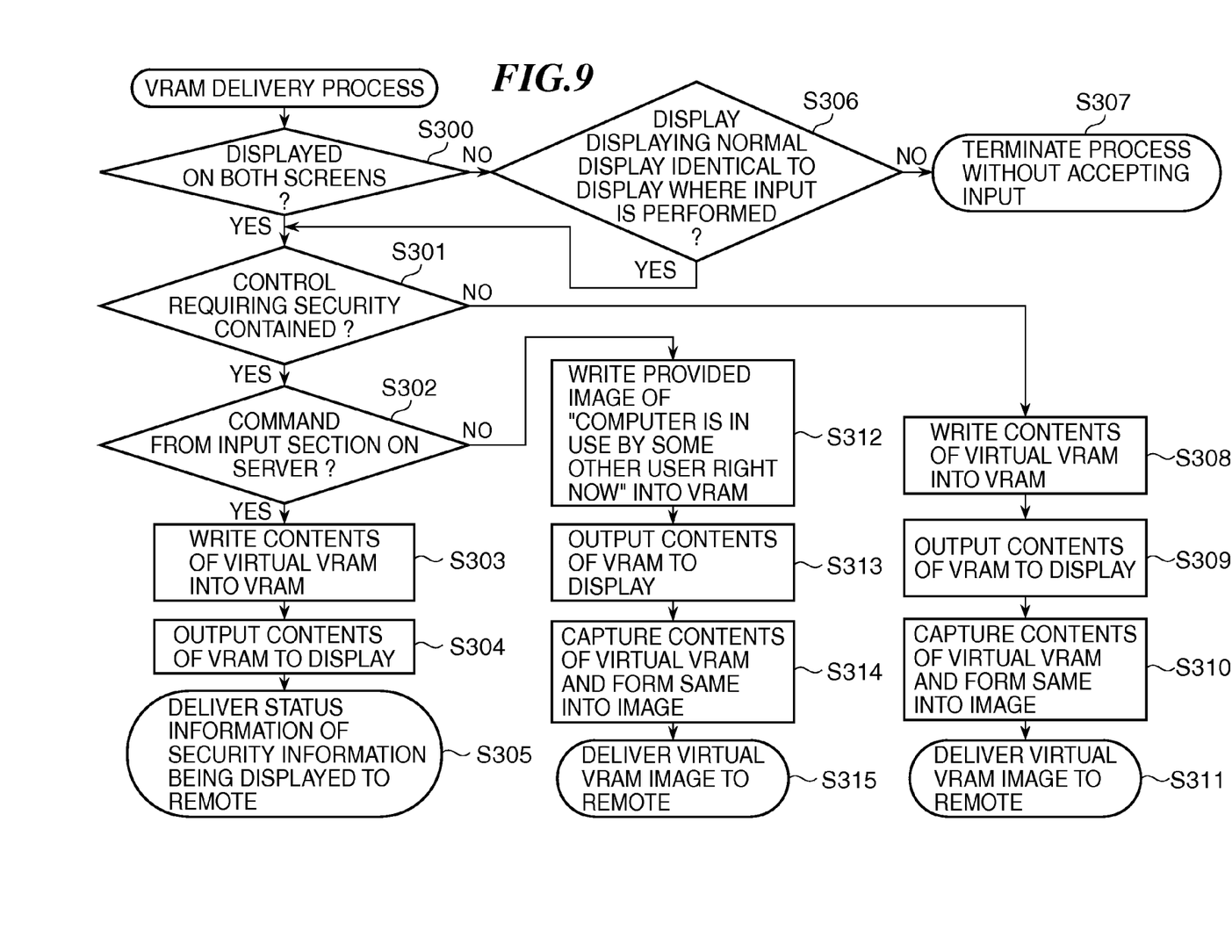
FIG. 9 is a flowchart of a VRAM delivery process executed by an information processing apparatus (server) of an information processing system including the information processing apparatus according to a second embodiment of the present invention.

Next, a description will be given of a second embodiment of the present invention with reference to FIGS. 9 and 10. The present embodiment is distinguished from the first embodiment only in the VRAM delivery process, but the other configuration thereof is the same as that of the first embodiment, and further, an information processing system configured to include the information processing apparatus (server) is also the same as that described hereinabove concerning the first embodiment. Therefore, component elements of the information processing system are denoted by the identical reference numerals, and the description thereof is omitted. FIG. 9 is a flowchart of a VRAM delivery process executed by the information processing apparatus (server) according to the second embodiment of the present invention.

Steps S300 to S304 in FIG. 9 executed by the information processing apparatus (server) according to the second embodiment are the same as the steps S100 to S104 in FIG. 3 executed by the information processing apparatus (server) according to the first embodiment, and hence a redundant description thereof is omitted. Similarly, steps S306 to S315 in FIG. 9 executed by the information processing apparatus (server) according to the second embodiment are the same as the steps S106 to S115 in FIG. 3 executed by the information processing apparatus (server) according to the first embodiment, and hence a redundant description thereof is omitted.

That is, the present embodiment is different from the first embodiment only in that the step S105 in FIG. 3 is replaced by a step S305 in FIG. 9.

In the step S105 in FIG. 3, the image displaying the message saying that e.g. "Computer is in use by some other user right now", which has been provided in advance in the image data recording section 106, is delivered to the client 300.

On the other hand, in the step S305 in FIG. 9, only status information to the effect that security information is being displayed on the display 105 of the serve 100 is delivered to the client 300, followed by terminating the present process. It should be noted that the status information may be a command to instruct not to display the security information on the client 300.

The image data of the dummy screen is stored in the image data recording section 306 of the client 300 in advance, and the client 300 creates and displays a screen with the message saying that "Computer is in use by some other user right now" in response to the reception of this status information from the server 100. This makes it possible to obtain the same effects as the VRAM delivery process in FIG. 3, and to reduce the load on the network by transmitting the status information of which data amount is smaller than the image data.

Figure 10:
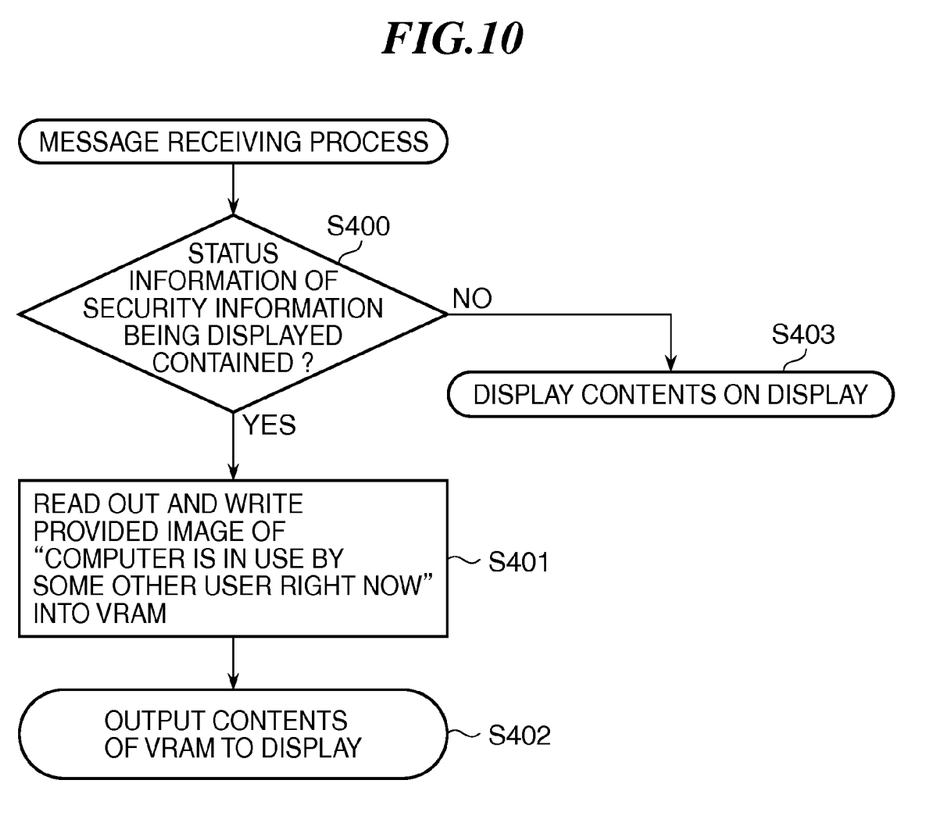
FIG. 10 is a flowchart of a message receiving process executed by a client when the client receives a message, after the VRAM delivery process in FIG. 9 is executed.

FIG. 10 is a flowchart of a message receiving process executed by the client 300 when a message is received by the client 300 after executing the VRAM delivery process in FIG. 9.

The term "message receiving process" is generally intended to mean a process executed upon reception of a message from the server 100 by the client 300, when using VNC or a like function. More specifically, the message receiving process is intended to mean a process of receiving an image by the screen reception section 602 after the image is transmitted to the client 300 by the screen transmission section 407 appearing in FIG. 2.

A program for executing this message receiving process is stored in e.g. the program memory 3022 of the client 300 and carried out by the CPU 3201 of the same.

Referring to FIG. 10, first, in a step S400, the contents having delivered from the server 100 to the remote computer i.e. the client 300 in the step S305, a step S311 or the step S315 in FIG. 9 are checked. Then, it is determined whether or not the status information to the effect that security information is being displayed which has been delivered by the process of the step S305 is contained.

If it is determined in the step S400 that the status information to the effect that security information is being displayed is not contained, the process proceeds to a step S403, wherein the contents of the delivered message are displayed on the display 305, followed by terminating the present process.

On the other hand, it is determined in the step S400 that the status information to the effect that security information is being displayed is contained, the process proceeds to a step S401.

In the step S401, the image (image data of the dummy screen) displaying the message saying that e.g. "Computer is in use by some other user right now" which has been provided in advance in the image data recording section 306 of the client 300 is read and written into the VRAM 304.

After writing the image into the VRAM 304, the process proceeds to a step S402 wherein the contents of the VRAM 304 are output to the display 305 of the client 300. To this end, the image provided in advance in the client 300 is stored at a predetermined location when the requirements of the client 300 are configured.

In the present embodiment, when the screen containing a control containing security information is displayed on the server 100, the image of the screen is not delivered to the client 300, but only the status information to the effect that security information is being displayed is delivered.

This causes the image containing the predetermined message saying that "Computer is in use by some other user right now", which has been provided in the client 300, to be displayed, to thereby prevent the image containing secret information from being delivered, ensuring security.

Further, when the screen containing a control containing security information is displayed on the client 300, as described above, the image containing the predetermined message saying that "Computer is in use by some other user right now", which has been provided in the server 100, is displayed on the server 100. This prevents secret information from being displayed, thereby ensuring security.

It is to be understood that the present invention may also be achieved by directly or remotely supplying a system or an apparatus with a control program for realizing the functions of the above described embodiments, and causing a computer included in the system or the like to read out and execute the supplied program code.

Therefore, to realize the functions/processes of the present invention on a computer or the above-described devices, the program code itself of the control program which is installed in the computer or the above-described devices also realizes the present invention. That is, the control program itself for realizing the above-described functions/processes is one of which realizes the present invention.

In this case, if having a function of a program, any program configuration can be employed, such as a program executed by object code and interpreter, or script data supplied to an OS, or the like.

Examples of the storage medium for supplying the program code include a flexible disk, a hard disk, an optical disk, a magnetic-optical disk, an MO, a CD-ROM, a CD-R, a CD-RW. Further, examples of the storage medium include a magnetic tape, a nonvolatile memory card, a ROM, a DVD (a DVD-ROM, a DVD-R) or the like.

Alternatively, the program may be downloaded from a website of the internet/intranet with using a browser of the client computer. That is, the computer program itself of the present invention, or a compressed file having a function of automatically installing can be downloaded in a storage medium such as a hard disc or the like from the website. Further, it is also possible to realize by dividing the program code which constructs the program of the present invention into a plurality of files, and downloading each of files from various websites. That is, a www server which causes a plurality of users to download the program file for realizing the function process of the present invention on a computer can also be a requirement which constitutes the present invention.

Further, the program of the present invention may be encrypted and stored in the storage medium such as a CD-ROM or the like, to distribute to the users. In this case, only users who satisfy predetermined conditions can download key information for decrypting the program from a website via the internet/intranet, and may carry out the program by decrypting the encrypted program with the key information, and install the program in the computer.

Further, it is to be understood that the above-described embodiments may be accomplished by executing the program code read out by a computer. It should be noted that an OS (operating system) or the like which operates on the computer may perform a part or all of the actual operations based on instructions of the program code. It is to be understood that also in this case, the functions of the above-described embodiments can be realized.

Further, it is to be understood that a program read out from the storage medium may be written into a memory provided on an expansion board inserted into a computer or a memory provided in an expansion unit connected to the computer. It should be noted that a CPU or the like provided in the expansion board or the expansion unit may perform a part or all of the actual operations based on instructions of the program. Thus, the above-described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-110184 filed Apr. 21, 2008, which is hereby incorporated by reference herein in its entirety.

What is claimed is:

1. An information processing apparatus that is connected to an external apparatus via a network comprising:

a display;

an operating section;

a network interface; and a control section, coupled to the display, the operating section, and the network interface, comprising one or more computer processors and one or more program memories storing program code executable by the one or more computer processors to cause the one or more computer processors to:

determine whether an instruction for displaying an operation screen containing security information is received via the operating section or via the network interface;

upon the determination that the instruction for displaying the operation screen containing the security information is received via the network interface: transmit to the external apparatus screen data that is processed for displaying the operation screen containing the security information, and while at the same time, prevent the operation screen containing the security information from being displayed by the display at the information processing apparatus;

upon the determination that the instruction for displaying the operation screen containing the security information is received via the operating section: display, by the display, the operation screen containing the security information, and while at the same time, prevent the screen data for displaying the operation screen containing the security information from being transmitted to the external apparatus;

upon the determination that the instruction for displaying the operation screen containing the security information is received via the network interface, display, by the display, a dummy screen; and upon the determination that the instruction for displaying the operation screen containing the security information is received via the operating section, transmit to the external apparatus image data for displaying a dummy screen, by the external apparatus, which does not contain the security information.

2. The information processing apparatus according to claim 1, wherein, the program code is executable by the one or more computer processors to cause the one or more computer processors to:
   upon the determination that the instruction for displaying the operation screen containing the security information is received via the operating section, transmit to the external apparatus status information indicating that the operation screen containing the security information is being displayed by the display.

3. The information processing apparatus according to claim 1, wherein, the program code is executable by the one or more computer processors to cause the one or more computer processors to:
   upon the determination that the instruction for displaying the operation screen containing the security information is received via the operating section, transmit to the external apparatus a command for instructing display of a dummy screen, which does not contain the security information, by the external apparatus.

4. The information processing apparatus according to claim 1, wherein the dummy screens each comprise an indication formed by text for avoiding display of the security information.

5. The information processing apparatus according to claim 1,
   wherein the program code is executable by the one or more computer processors to cause the one or more computer processors to:
   detect that a communication with the external apparatus via the network is disconnected; and
   upon transmission to the external apparatus of the screen data for displaying the operation screen containing the security information and upon prevention of the operation screen containing the security information from being displayed by the display, display, by the display, the operation screen containing the security information, in response to the detection of disconnection of the communication with the external apparatus via the network.

6. A method of controlling an information processing apparatus, which is connected to an external device via a network and includes: a display; an operating section; a network interface; and a control section coupled to the display, the operating section, and the network interface, the control section including one or more computer processors and one or more program memories storing program code executable by the one or more computer processors to execute the method, and the method comprising the steps of:
   determining, by the control section, whether an instruction for displaying an operation screen containing security information is received via the operating section as originating from the information processing apparatus or via the network interface from the external apparatus;
   upon the determination in the determining step that the instruction for displaying the operation screen containing the security information is received via the network interface: transmitting to the external apparatus, by the control section, screen data that is processed for displaying the operation screen containing the security information, and while at the same time, preventing the operation screen containing the security information from being displayed by the display at the information processing apparatus;
   upon the determination in the determining step that the instruction for displaying the operation screen containing the security information is received via the operating section: displaying, by the display, the operation screen containing the security information, and while at the same time, preventing the screen data for displaying the operation screen containing the security information from being transmitted to the external apparatus;
   upon the determination in the determining step that the instruction for displaying the operation screen containing the security information is received via the network interface, displaying, by the display, a dummy screen; and
   upon the determination in the determining step that the instruction for displaying the operation screen containing the security information is received via the operating section, transmitting to the external apparatus image data for displaying a dummy screen, by the external apparatus, which does not contain the security information.

7. A non-transitory computer-readable storage medium storing program code executable by one or more computer processors of an information processing apparatus which is connected to an external device via a network, the information processing apparatus including: a display; an operating section; and a network interface coupled to the one or more computer processors, wherein the program code is executable by the one or more computer processors to cause the one or more computer processors to:
   determine whether an instruction for displaying an operation screen containing security information is received via the operating section as originating from the information processing apparatus or via the network interface from the external apparatus;
   upon the determination that the instruction for displaying the operation screen containing the security information is received via the network interface: transmit to the external apparatus screen data that is processed for displaying the operation screen containing the security information, and while at the same time, prevent the operation screen containing the security information from being displayed by the display at the information processing apparatus;
   upon the determination that the instruction for displaying the operation screen containing the security information is received via the operating section: display, by the display, the operation screen containing the security information, and while at the same time, prevent the screen data for displaying the operation screen containing the security information from being transmitted to the external apparatus;
   upon the determination that the instruction for displaying the operation screen containing the security information is received via the network interface, display, by the display, a dummy screen; and
   upon the determination that the instruction for displaying the operation screen containing the security information is received via the operating section, transmit to the external apparatus image data for displaying a dummy screen, by the external apparatus, which does not contain the security information.

* * * * *